(12) United States Patent
Byun et al.

(10) Patent No.: US 11,011,809 B2
(45) Date of Patent: May 18, 2021

(54) RECHARGEABLE BATTERY

(71) Applicant: SAMSUNG SDI CO., LTD., Yongin-si (KR)

(72) Inventors: Sangwon Byun, Yongin-si (KR); Minseok Koo, Yongin-si (KR); Hyunyoung Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 445 days.

(21) Appl. No.: 15/130,745

(22) Filed: Apr. 15, 2016

(65) Prior Publication Data

US 2017/0084902 A1 Mar. 23, 2017

(30) Foreign Application Priority Data

Sep. 17, 2015 (KR) .......................... 10-2015-0131381

(51) Int. Cl.
*H01M 50/543* (2021.01)
*H01M 50/172* (2021.01)

(52) U.S. Cl.
CPC ....... *H01M 50/543* (2021.01); *H01M 50/172* (2021.01)

(58) Field of Classification Search
CPC ........ H01M 2/30; H01M 2/06; H01M 50/172; H01M 50/174; H01M 50/176;

(Continued)

(56) References Cited

U.S. PATENT DOCUMENTS

| | | | |
|---|---|---|---|
| 2011/0281155 A1 | 11/2011 | Ito et al. | |
| 2011/0300435 A1* | 12/2011 | Byun | H01M 2/30 |
| | | | 429/178 |

(Continued)

FOREIGN PATENT DOCUMENTS

| | | | | |
|---|---|---|---|---|
| CN | 105470417 | * | 4/2016 | ............. H01M 2/04 |
| KR | 2003-0081938 A | | 10/2003 | |

(Continued)

OTHER PUBLICATIONS

Spiral Ring Etsy {https://www.etsy.conn/listing/535312170/sterling-silver-gold-or-rose-gold-band?ga_order=most_relevant&ga_search_type=all&ga_view_type=gallery&ga_search_query=spiral+ring&ref=sr_gallery-1-2&pro=1} printed Mar. 18, 2019.*

(Continued)

*Primary Examiner* — Cynthia H Kelly
*Assistant Examiner* — Aaron J Greso
(74) *Attorney, Agent, or Firm* — Lewis Roca Rothgerber Christie LLP

(57) ABSTRACT

A rechargeable battery includes: a case; an electrode assembly accommodated in the case; a cap plate sealing a top opening of the case; and a first electrode terminal. The first electrode terminal includes a first terminal pillar electrically connected to the electrode assembly and passing through the cap plate to upwardly protrude therefrom, and a first terminal plate having a first terminal opening. The first terminal pillar has a slit groove extending along its outer periphery at an upper end thereof, and the first terminal plate includes a protruding portion which protrudes into the first terminal opening and is in the slit groove of the first terminal pillar to couple the first terminal plate to the first terminal pillar.

9 Claims, 4 Drawing Sheets

(58) Field of Classification Search
CPC ............. H01M 50/178; H01M 50/179; H01M 50/181; H01M 50/543
See application file for complete search history.

(56) References Cited

U.S. PATENT DOCUMENTS

| | | | |
|---|---|---|---|
| 2013/0095374 A1* | 4/2013 | Kim ........................ | H01M 2/30 429/179 |
| 2014/0147736 A1 | 5/2014 | You et al. | |
| 2015/0072222 A1 | 3/2015 | Byun et al. | |
| 2015/0086857 A1* | 3/2015 | Moon ..................... | H01M 2/30 429/178 |

FOREIGN PATENT DOCUMENTS

| KR | 10-2011-0126538 A | 11/2011 |
|---|---|---|
| KR | 10-2014-0066574 A | 6/2014 |
| KR | 10-2015-0030548 A | 3/2015 |

OTHER PUBLICATIONS

CN 105470417 English Machine translation printed May 8, 2020.*
CN 105470417 ESPACENET Abstract printed May 8, 2020.*

* cited by examiner

RECHARGEABLE BATTERY

CROSS-REFERENCE TO RELATED APPLICATION

This application claims priority to and the benefit of Korean Patent Application No. 10-2015-0131381, filed on Sep. 17, 2015 in the Korean Intellectual Property Office, and all the benefits accruing therefrom under 35 U.S.C. § 119, the contents of which are herein incorporated by reference in their entirety.

BACKGROUND

1. Field

Embodiments of the present invention relate to a rechargeable battery.

2. Description of the Related Art

Unlike primary batteries which are not designed be recharged, rechargeable secondary batteries are designed to be repeatedly charged and discharged. Low capacity batteries that use single battery cells packaged in a pack type may be used as power sources for various small, portable electronic devices, such as cellular phones and camcorders, for example. High power batteries that use tens of battery cells connected to each other in a battery pack may be used as power sources for electric scooters and hybrid electric vehicles, for example.

Rechargeable batteries may be manufactured in various shapes, including a cylinder shape and a prismatic shape. The rechargeable battery may be fabricated by forming an electrode assembly having a separator as an insulator disposed between a positive electrode plate and a negative electrode plate, accommodating the fabricated electrode assembly and an electrolyte in a case, and installing a cap assembly on the case.

Positive and negative electrode terminals are connected to the electrode assembly and are exposed or protrude to the outside of the case through a cap plate.

SUMMARY

Embodiments of the present invention provide a rechargeable battery in which a coupling strength between a terminal pillar and a terminal plate can be increased by increasing a contact area therebetween due to a slit groove provided in the terminal pillar and a protruding part provided in the terminal plate.

Embodiments of the present invention also provide a rechargeable battery in which a terminal pillar is coupled to a terminal plate without welding, thereby reducing or preventing thermal shock due to a difference in thermal expansion coefficients of different metals.

The above and other aspects of embodiments of the present invention will be described in or will be apparent from the following description of exemplary embodiments.

According to an embodiment of the present invention, there is provided a rechargeable battery including a case; an electrode assembly accommodated in the case; a cap plate sealing a top opening of the case; and a first electrode terminal including a first terminal pillar electrically connected to the electrode assembly and passing through the cap plate to upwardly protrude therefrom, the first terminal pillar having a slit groove extending along its outer periphery at an upper end thereof; and a first terminal plate having a first terminal opening, the first terminal plate including a protruding portion which protrudes into the first terminal opening and is in the slit groove of the first terminal pillar to couple the first terminal plate to the first terminal pillar.

The upper end may include an upper protruding portion at a top portion of the slit groove and protruding toward the first terminal plate; and a lower protruding portion at a bottom portion of the slit groove and protruding toward the first terminal plate.

A bottom surface of the upper protruding portion and a top surface of the lower protruding portion may be parallel with a top surface of the cap plate.

The bottom surface of the upper protruding portion may be parallel with a top surface of the cap plate and the top surface of the lower protruding portion may be inclined with respect to the top surface of the cap plate.

The slit groove may have a ring shape and may extend along the outer periphery of the first terminal pillar.

The upper protruding portion may be formed by riveting or spinning.

The slit groove, the upper protruding portion, and the lower protruding portion may be contact the protruding portion and an inner surface of the first terminal opening of the first terminal plate.

The protruding portion of the first terminal plate may protrude toward a central axis of the first terminal pillar, and the protruding portion may have a ring shape extending along an inner surface of the first terminal opening.

The first terminal pillar may include the upper end which is in the first terminal opening of the first terminal plate and on which the slit groove is arranged; a bottom end connected to the electrode assembly; and a connecting portion connecting the upper end and the bottom end and passing through the cap plate.

An outer periphery of the connecting portion may be larger than an outer periphery of the upper end and may be smaller than an outer periphery of the bottom end.

A top surface of the connecting part may contact the bottom surface of the terminal plate.

As described above, a rechargeable battery according to embodiments of the present invention provides increased coupling strength between a terminal pillar and a terminal plate by increasing a contact area therebetween by having a slit groove provided in the terminal pillar and a protruding part provided in the terminal plate.

In addition, a rechargeable battery according to embodiments of the present invention provides a terminal pillar which is coupled to a terminal plate without welding, thereby reducing or preventing thermal shock due to a difference in thermal expansion coefficients of different metals.

BRIEF DESCRIPTION OF THE DRAWINGS

The above and other features of the present invention will be more apparent by describing, in detail, exemplary embodiments thereof with reference to the attached drawings in which.

DETAILED DESCRIPTION

Figure 1A:
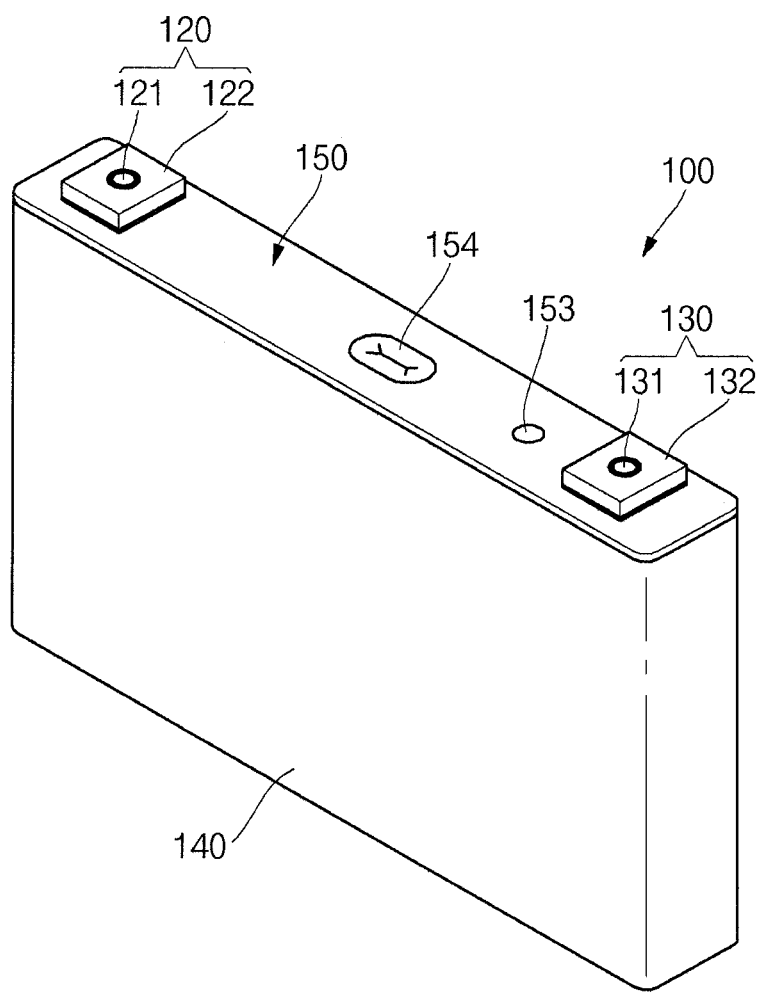
FIG. 1A is a perspective view of a rechargeable battery according to an embodiment of the present invention.

Hereinafter, exemplary embodiments of the present invention will be described, in detail, with reference to the accompanying drawings such that they can easily be made and used by those skilled in the art.

It will be understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 1B:
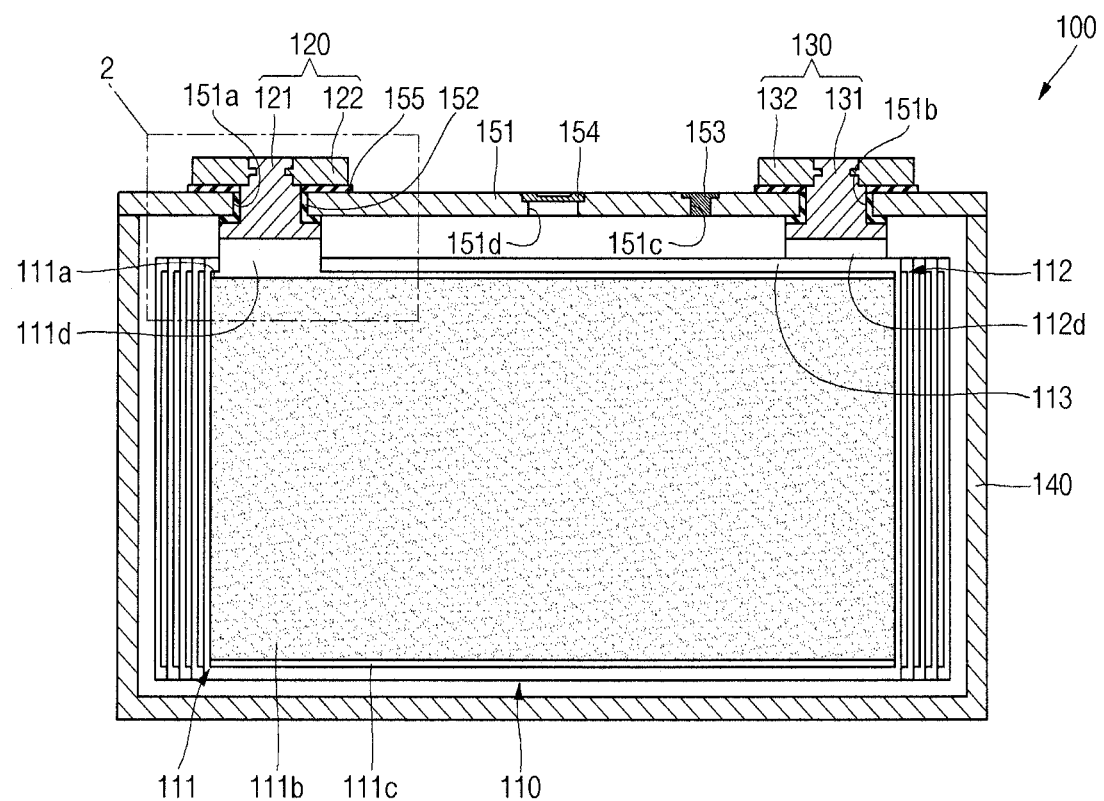
FIG. 1B is a sectional view of the rechargeable battery illustrated in FIG. 1A.
Figure 2:
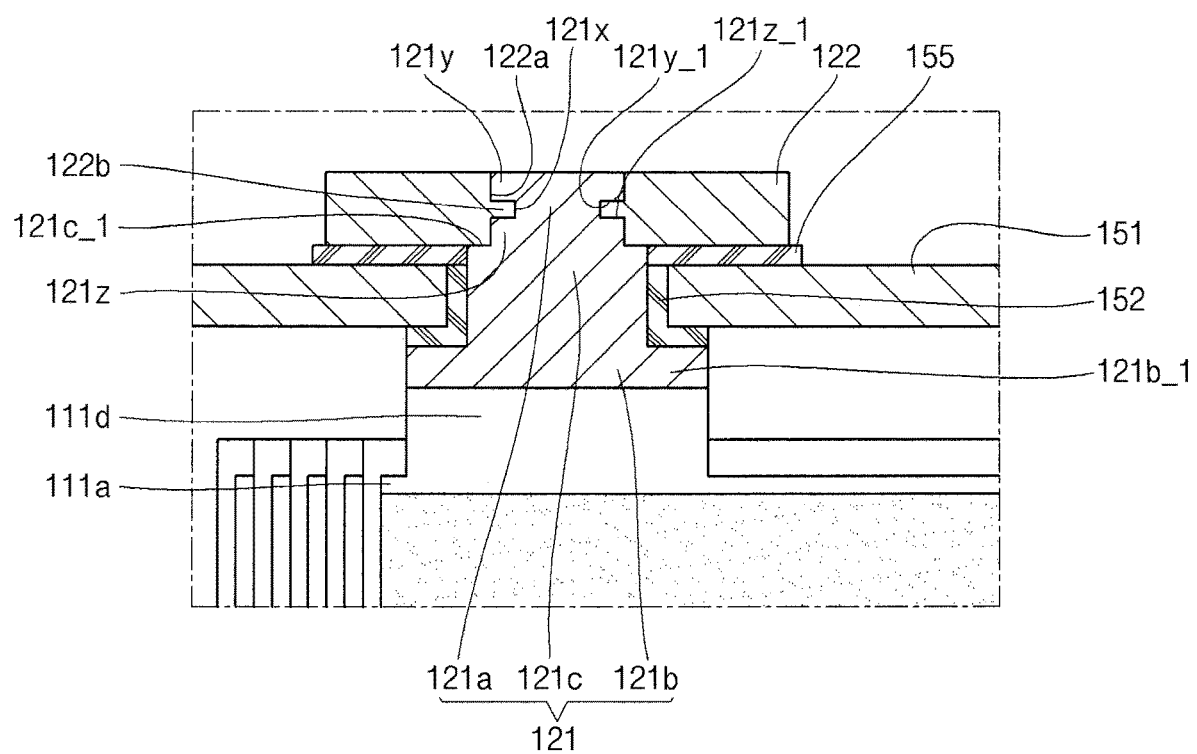
FIG. 2 is an enlarged view of the portion 2 of the rechargeable battery illustrated in FIG. 1B.

FIGS. 1A and 1B are a perspective view and a sectional view, respectively, of a rechargeable battery 100 according to an embodiment of the present invention. FIG. 2 is an enlarged view of the portion 2 of the rechargeable battery 100 illustrated in FIG. 1B.

As illustrated in FIGS. 1A and 1B, the rechargeable battery 100 includes an electrode assembly 110, a first electrode terminal 120, a second electrode terminal 130, a case 140, and a cap assembly 150. Hereinafter, the rechargeable battery 100 will be described in more detail with reference to FIGS. 1A, 1B, and 2.

The electrode assembly 110 may be formed by winding a stacked structure of a first electrode 111, a separator 113, and a second electrode 112. In one embodiment, the first electrode 111 may function as a positive electrode and the second electrode 112 may function as a negative electrode. However, the present invention is not limited thereto, and in other embodiments, the first electrode 111 may function as the negative electrode and the second electrode 112 may function as the positive electrode.

The first electrode 111 includes a first electrode current collector 111a formed of a metal foil or mesh made of, for example, copper, a copper alloy, nickel, or a nickel alloy, a first coated portion 111b formed by coating a first electrically active material, such as a transition metal oxide, on the first electrode current collector 111a, a first non-coated portion (e.g., a first uncoated portion) 111c that is a region of the first electrode current collector 111a on which the first electrically active material is not coated, and a first current collector tab 111d extending from the first non-coated portion 111c toward an exterior side (e.g., extending upwardly) and electrically connected to the first electrode terminal 120. In one embodiment, the first current collector tab 111d is a path for the flow of current between the first electrode 111 and the first electrode terminal 120. The first current collector tab 111d may be the first non-coated portion 111c itself (e.g., may be formed integrally with the first non-coated portion 111c) or may be a separate member connected to the first non-coated portion 111c. In the latter embodiment, the first current collector tab 111d may be nickel, a nickel alloy, copper, a copper alloy, or equivalents thereof.

The second electrode 112 includes a second electrode current collector formed of a metal foil or mesh made of, for example, aluminum or an aluminum alloy, a second coated portion formed by coating a second electrically active material, such as graphite or carbon, on the second electrode current collector, a second non-coated portion (e.g., a second uncoated portion) that is a region of the second electrode current collector on which the second electrically active material is not coated, and a second current collector tab 112d extending from the second non-coated portion to an exterior side (e.g., extending upwardly) and electrically connected to the second electrode terminal 130. The second current collector tab 112d may be the second electrode 112 or the second non-coated portion itself (e.g., may be integrally formed with the second non-coated portion) or may be a separate member connected to the second non-coated portion. In the latter embodiment, the second current collector tab 112d may be aluminum, an aluminum alloy, or equivalents thereof.

The separator 113 may be interposed between the first electrode 111 and the second electrode 112 and may act to prevent a short circuit between the first electrode 111 and the second electrode 112 while allowing lithium ions to move. The separator 113 may be made of polyethylene, polypropylene, or a copolymer of polyethylene and polypropylene. However, the material of the separator 113 is not limited to those listed herein.

When the first and second current collector tabs 111d and 112d are directly electrically connected to the first and second electrode terminals 120 and 130 without separate members (e.g., without intervening members or elements), an electric path of the electrode assembly 110 is shortened, thereby reducing internal resistance of the rechargeable battery 100 and reducing the number of components.

The electrode assembly 110 is accommodated in the case 140 with an electrolyte. The electrolyte may include an organic solvent, such as EC, PC, DEC, EMC, or DMC, and a lithium salt, such as $LiPF_6$ or $LiBF_4$. The electrolyte may exist in a liquid, solid, or gel phase.

The first electrode terminal 120 is connected to the first current collector tab 111d of the electrode assembly 110 and includes a first terminal pillar 121 which passes through the cap plate 151 to upwardly protrude therefrom, and a first terminal plate 122 coupled to the first terminal pillar 121 and positioned on a top surface of the cap plate 151.

The first terminal pillar 121 passes through a first terminal opening 151a (e.g., a first terminal hole) of the cap plate 151 to upwardly protrude above the cap plate 151 (e.g., to extend a certain height above the cap plate 151) and is electrically connected to the first current collector tab 111d of the electrode assembly 110 under the cap plate 151. The first terminal pillar 121 may be made of copper or a copper alloy.

The first terminal pillar 121 has one end 121a (e.g., an upper end) which is inserted into a first terminal opening 122a (e.g., a first terminal opening) which passes through a region between top and bottom surfaces of the first terminal plate 122 at an upper portion of the cap plate 151, another end 121b (e.g., a lower end) which is connected to the electrode assembly 110 at a lower portion of (e.g., under) the cap plate 151, and a connecting portion 121c which connects (e.g., extends between) the one end 121a and the other end 121b to each other and is inserted into the first terminal opening 151a of the cap plate 151. The first terminal pillar 121 may have a cylindrical shape and may be formed as a single body (e.g., may be integrally formed). An outer periphery (or a diameter) of the connecting portion 121c may be larger than that of the one end 121a, and an outer periphery (or a diameter) of the other end 121b may be larger than that of the connecting portion 121c. Central axes of the one end 121a, the other end 121b, and the connecting portion 121c may be positioned along the same line.

The one end 121a of the first terminal pillar 121 is inserted into the first terminal opening 122a of the first terminal plate 122 and includes a slit groove 121x formed along its outer periphery to be parallel with the cap plate 151. The slit groove 121x may be formed as a circular ring along the periphery of the one end 121a of the first terminal pillar 121. For example, the one end 121a includes protruding portions 121y and 121z provided above and below the slit groove 121x, respectively. In addition, a bottom surface 121y_1 of the upper protruding portion 121y and a top surface 121z_1 of the lower protruding portion 121z may be parallel with each other. The one end 121a may be tightly coupled to the first terminal plate 122 by forming the upper protruding portion 121y by riveting or spinning in a state in which the lower protruding portion 121z and the slit groove 121x are in the first terminal opening 122a of the first terminal plate 122. The one end 121a includes the slit groove 121x so that the bottom surface 121y_1 of the upper protruding portion 121y and the top surface 121z_1 of the lower protruding portion 121z are brought into contact with the inner surface of the first terminal plate 122 at the first terminal opening 122a to increase a contact area between the first terminal pillar 121 and the first terminal plate 122. In addition, because a separate welding process is not required, it is possible to reduce or prevent thermal shock from occurring due to a difference in thermal expansion coefficients which may be caused when the first terminal pillar 121 and the first terminal plate 122 made of different metals are welded to each other. The first terminal opening 122a of the first terminal plate 122 may have a shape which oppositely corresponds to a shape of the outer periphery of the one end 121a of the first terminal pillar 121.

The other end 121b includes a flange 121b_1 positioned under the cap plate 151 and protruding away from a central axis of the first terminal pillar 121 in a horizontal direction such that the flange 121b_1 prevents the first terminal pillar 121 from being dislodged from the cap plate 151. For example, a step difference may be created between the other end 121b and the connecting portion 121c of the first terminal pillar 121 by the flange 121b_1.

The connecting portion 121c is inserted into the first terminal opening 151a which passes through a region between the top and bottom surfaces of the cap plate 151. The connecting portion 121c has a cylindrical shape and has a diameter larger than the one end 121a and smaller than the other end 121b. For example, the connecting portion 121c may have step differences at where it contacts the one end 121a and the other end 121b. The connecting portion 121c has a portion 121c_1 of its top surface which is brought into contact with the bottom surface of the first terminal plate 122 by the step difference between the one end 121a. For example, a central portion of the top surface of the connecting portion 121c is connected to the one end 121a and edge portions of the top surface of the connecting portion 121c are brought into contact with the bottom surface of the first terminal plate 122.

The first terminal plate 122 is positioned on the cap plate 151 and has the first terminal opening 122a which extends its top and bottom surfaces. After the first terminal plate 122 is coupled to the first terminal pillar 121 which is in the first terminal opening 122a, it may be fixed thereto by riveting or spinning. The first terminal plate 122 may be made of aluminum or an aluminum alloy.

The first terminal plate 122 has a protruding portion 122b provided in the first terminal opening 122a so as to protrude toward the central axis of the first terminal pillar 121. The protruding portion 122b may be spaced from the top and bottom surfaces of the first terminal plate 122. The protruding portion 122b may be coupled to (e.g., may extend into) the slit groove 121x of the first terminal pillar 121 and may be shaped to correspond to the slit groove 121x. The protruding portion 122b may have a ring shape formed along an inner surface of the first terminal opening 122a of the first terminal plate 122. For example, the protruding portion 122b protrudes in a horizontal direction into the first terminal opening 122a of the first terminal plate 122 and is coupled to the slit groove 121x of the first terminal pillar 121. In addition, the inner surface of the first terminal opening 122a may be brought into close contact with the upper protruding portion 121y and the lower protruding portion 121z of the first terminal pillar 121.

As described above, because the first terminal plate 122 and the first terminal pillar 121 of the first electrode terminal 120, which are made of different metals, are mechanically coupled to each other by riveting or spinning, the cost required to weld different metals to each other can be avoided and thermal shock due to a difference between the thermal expansion coefficients can be reduced or prevented. In addition, because the first electrode terminal 120 provides increased contact area between the first terminal pillar 121 and the first terminal plate 122 due to the slit groove 121x of the first terminal pillar 121 and the protruding portion 122b of the first terminal plate 122, a coupling strength therebetween can be increased.

The second electrode terminal 130 includes a second terminal pillar 131 connected to the second current collector tab 112d of the electrode assembly 110 and passing through the cap plate 151 to upwardly protrude therefrom, and a second terminal plate 132 coupled to the second terminal pillar 131 and positioned on the top surface of the cap plate 151. The second electrode terminal 130 may be the same or substantially the same as the first electrode terminal 120 in view of its configuration and shape.

The case 140 is made of a conductive metal, such as aluminum, an aluminum alloy, or nickel plated steel, and has a substantially rectangular parallelepiped shape having an opening through which the electrode assembly 110 is inserted and placed. Because the case 140 and the cap assembly 150 are illustrated in FIGS. 1A and 1B in a state in which they are coupled to each other, the opening is not easily visible but is a substantially open portion at the periphery of the cap assembly 150. The inner surface of the case 140 is subjected to insulation treatment to then be insulated from the electrode assembly 110.

The cap assembly 150 is coupled to the case 140. For example, the cap assembly 150 includes the cap plate 151, a seal gasket 152, a plug 153, a safety vent 154, and an insulating member 155.

The cap plate 151 has a substantially plate-like shape and seals the opening of the case 140. The cap plate 151 may be made of the same material as the case 140. For example, the cap plate 151 may be coupled to the case 140 by laser welding. The cap plate 151 includes the first terminal opening 151a through which the first terminal pillar 121 of the first electrode terminal 120 passes and a second terminal opening 151b (e.g., a second terminal hole) through which the second terminal pillar 131 of the second electrode terminal 130 passes.

The seal gasket 152, made of an insulating material, may be interposed between the first terminal pillar 121 and the cap plate 151 and between the second terminal pillar 131 and the cap plate 151. For example, the seal gasket 152 may seal spaces between the first terminal pillar 121 and the cap plate 151 and between the second terminal pillar 131 and the cap plate 151. The seal gasket 152 may also prevent external moisture from permeating into the inside of the rechargeable battery 100 (e.g., inside the case 140) and may prevent an electrolyte contained in the rechargeable battery 100 from flowing out.

The plug 153 may seal an electrolyte injection opening 151c (e.g., an electrolyte injection hole) of the cap plate 151, and the safety vent 154 is installed in a vent opening 151d (e.g., a vent hole) of the cap plate 151 and has a notch configured to be opened at a certain pressure (e.g., a preset or predetermined pressure).

The insulating member 155 is disposed between the first terminal plate 122 and the cap plate 151 and between the second terminal plate 132 and the cap plate 151. The insulating member 155 may electrically insulate the first terminal plate 122 and the cap plate 151 from each other and may electrically insulate the second terminal plate 132 and the cap plate 151 from each other. In addition, the insulating member 155 may be brought into close contact with the cap plate 151. Further, the insulating member 155 may also be brought into close contact with the seal gasket 152.

Figure 3A:
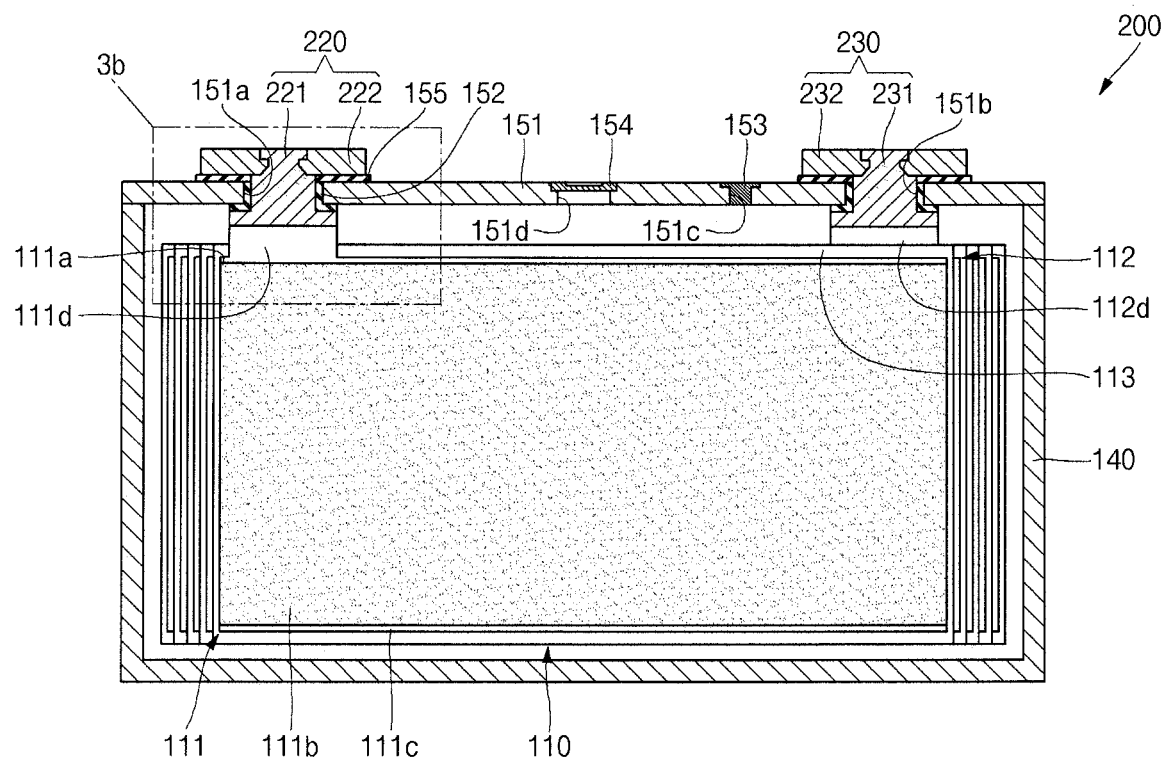
FIG. 3A is a sectional view of a rechargeable battery according to another embodiment of the present invention.
Figure 3B:
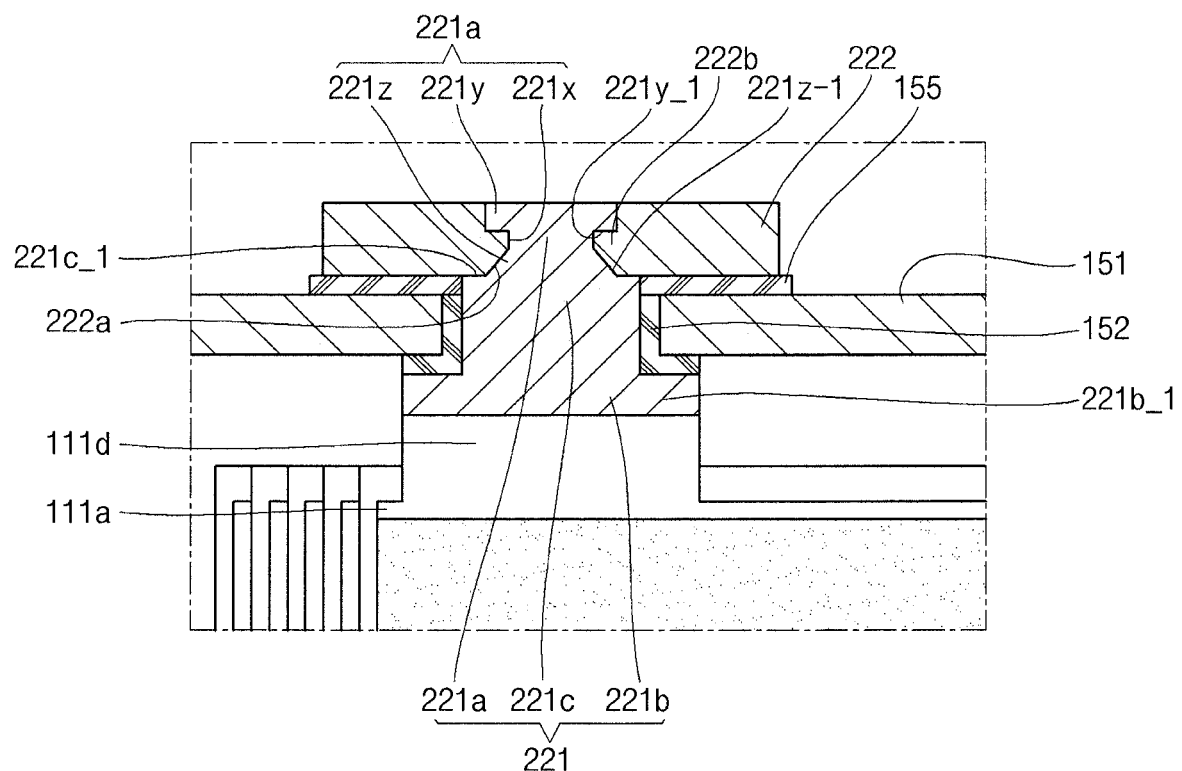
FIG. 3B is an enlarged view of the portion 3 of the rechargeable battery illustrated in FIG. 3A.

FIG. 3A is a sectional view of a rechargeable battery according to another embodiment of the present invention. FIG. 3B is an enlarged view of the portion 3b of FIG. 3A.

As illustrated in FIGS. 3A and 3B, the rechargeable battery 200 includes an electrode assembly 110, a first electrode terminal 220, a second electrode terminal 230, a case 140, and a cap assembly 150. The electrode assembly 110, the case 140, and the cap assembly 150 of the rechargeable battery 200 are the same or substantially the same as corresponding components of the rechargeable battery 100 illustrated in FIGS. 1A and 1B. Therefore, the following description of the rechargeable battery 200 will focus on the first electrode terminal 220 and the second electrode terminal 230, which are distinguished from the rechargeable battery 100 according to the previously-described embodiment.

The first electrode terminal 220 includes a first terminal pillar 221 electrically connected to a first current collector tab 111d of the electrode assembly 110 and passing through the cap plate 151 to upwardly protrude therefrom, and a first terminal plate 222 coupled to the first terminal pillar 221 and positioned on a top surface of the cap plate 151.

The first terminal pillar 221 passes through a first terminal opening 151a (e.g., a first terminal hole) of the cap plate 151 to upwardly protrude from the cap plate 151 (e.g., to protrude above the cap plate by a certain or predetermined height) and is electrically connected to the first current collector tab 111d of the electrode assembly 110 under the cap plate 151. The first terminal pillar 221 may be made of copper or a copper alloy.

The first terminal pillar 221 has one end 221a (e.g., an upper end) inserted into a first terminal opening 222a (e.g., a first terminal hole) which extends between top and bottom surfaces of the first terminal plate 222 at an upper portion of the cap plate 151, another end 221b (e.g., a lower end) connected to the electrode assembly 110 at a lower portion of the cap plate 151, and a connecting portion 221c connecting the one end 221a and the other end 221b to each other and inserted into the first terminal opening 151a of the cap plate 151. The first terminal pillar 221 may have a cylindrical shape and may be formed as a single body. An outer periphery (or a diameter) of the connecting portion 221c may be larger than that of the one end 221a, and an outer periphery (or a diameter) of the other end 221b may be larger than that of the connecting portion 221c. Central axes of the one end 221a, the other end 221b, and the connecting portion 221c may be positioned along the same line.

The one end 221a of the first terminal pillar 221 is inserted into the first terminal opening 222a of the first terminal plate 222 and includes a slit groove 221x formed along the outer periphery thereof and parallel with the cap plate 151. For example, the one end 221a includes protruding portions 221y and 221z provided above and below the slit groove 221x. In addition, a bottom surface 221y_1 of the upper protruding portion 221y may be parallel with a top surface of the cap plate 151. In addition, a top surface 221z_1 of the lower protruding portion 221z is inclined, extending at an angle (e.g., a predetermined angle) with respect to the top surface of the cap plate 151. For example, the lower protruding portion 221z is conical and the top surface 221z_1 thereof is an inclined surface.

The one end 221a may be tightly coupled to the first terminal plate 222 by forming the upper protruding portion 221y by riveting or spinning in a state in which the lower protruding portion 221z and the slit groove 221x are inserted into the first terminal opening 222a of the first terminal plate 222.

The one end 221a includes the slit groove 221x so that the bottom surface 221y_1 of the upper protruding portion 221y and the top surface 221z_1 of the lower protruding portion 221z are brought into contact with the first terminal plate 222 at the first terminal opening 222a to increase a contact area between the first terminal pillar 221 and the first terminal plate 222, thereby securing a coupling strength between the first terminal pillar 221 and the first terminal plate 222. In addition, when the first terminal pillar 221 and the first terminal plate 222 are made of different metals, it is possible to reduce or prevent thermal shock from occurring due to a difference in thermal expansion coefficients between the first terminal pillar 221 and the first terminal plate 222. The first terminal opening 222a of the first terminal plate 222 may have an oppositely corresponding shape as the outer periphery of the one end 221a of the first terminal pillar 221.

The other end 221b includes a flange 221b_1 positioned under the cap plate 151 and protruding from the first terminal pillar 221 in a horizontal direction to prevent the first terminal pillar 221 from being dislodged from the cap plate 151. For example, a step difference may be created between the other end 221b and the connecting portion 221c due to the flange 221b_1.

The connecting portion 221c is inserted into the first terminal opening 151a which extends between the top and bottom surfaces of the cap plate 151. The connecting portion 221c has a cylindrical shape and has a diameter larger than the one end 221a and smaller than the other end 221b. For example, the connecting portion 221c may have step differences at its portions connected to the one end 221a and the other end 221b. The connecting portion 221c has a portion 221c_1 of its top surface brought into contact with the bottom surface of the first terminal plate 222 at the step difference between the one end 221a. For example, a central portion of the top surface of the connecting portion 221c is connected to the one end 221a and edge portions of the top surface of the connecting portion 221c are brought into contact with the bottom surface of the first terminal plate 222.

The first terminal plate 222 is positioned on the cap plate 151 and has the first terminal opening 222a which extends between its top and bottom surfaces. After the first terminal plate 222 is coupled to the first terminal pillar 221 at the first terminal opening 222a, it may be fixed thereto by riveting or spinning. The first terminal plate 222 may be made of aluminum or an aluminum alloy.

The first terminal plate 222 has a protruding portion 222b protruding into the first terminal opening 222a toward the central axis of the first terminal pillar 221. The protruding portion 222b may be spaced from the top and bottom surfaces of the first terminal plate 222. The protruding portion 222b may be coupled to (e.g., may extend into) the slit groove 221x of the first terminal pillar 221 and may be shaped to correspond to the slit groove 221x. The protruding portion 222b may have a ring shape formed along an inner surface of the first terminal opening 222a of the first terminal plate 222. For example, the protruding portion 222b may have a top surface parallel with the cap plate 151 and a bottom surface inclined with respect to the top surface parallel with the cap plate 151. For example, the bottom surface of the protruding portion 222b may be an inclined surface downwardly extending along an exterior side of the first terminal pillar 221. The protruding portion 222b protrudes in a horizontal direction into the first terminal opening 222a of the first terminal plate 222 and is coupled to the slit groove 221x of the first terminal pillar 221. In addition, the inner surface of the first terminal opening 222a may be brought into close contact with the bottom surface 221y_1 of the upper protruding portion 221y and the top surface 221z_1 of the lower protruding portion 221z of the first terminal pillar 221.

As described above, because the first terminal plate 222 and the first terminal pillar 221 of the first electrode terminal 220, which are made of different metals, are mechanically coupled to each other by riveting or spinning, the cost required to weld different metals to each other can be avoided. In addition, because the first electrode terminal 220 has an increased contact area due to the slit groove 221x of the first terminal pillar 221 and the protruding portion 222b of the first terminal plate 222, a coupling strength between the first terminal pillar 221 and the first terminal plate 222 can be secured and thermal shock due to a difference between the thermal expansion coefficients can be reduced or prevented.

The second electrode terminal 230 includes a second terminal pillar 231 connected to the second current collector tab 112d of the electrode assembly 110 and passing through the cap plate 151 to upwardly protrude therefrom, and a second terminal plate 232 coupled to the second terminal pillar 231 and positioned on the top surface of the cap plate 151. The second electrode terminal 230 may be the same or substantially the same as the first electrode terminal 220 in view of its configuration and shape.

While aspects of the present invention have been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A rechargeable battery comprising:
   a case;
   an electrode assembly accommodated in the case;
   a cap plate sealing a top opening of the case; and
   a first electrode terminal comprising:
      a first terminal pillar electrically connected to the electrode assembly and passing through the cap plate to upwardly protrude therefrom, the first terminal pillar having a slit groove extending along its outer periphery at an upper end thereof; and
      a first terminal plate having a first terminal opening, the first terminal plate comprising a protruding portion spaced apart from a lower surface of the first terminal plate, the protruding portion protruding into the first terminal opening and being in the slit groove of the first terminal pillar to couple the first terminal plate to the first terminal pillar,
   wherein the first terminal pillar comprises:

the upper end which is in the first terminal opening of the first terminal plate and on which the slit groove is arranged;

a bottom end connected to the electrode assembly; and a connecting portion connecting the upper end and the bottom end and passing through the cap plate, wherein the upper end, the bottom end, and the connecting portion are made of a same material, and wherein an outer periphery of the connecting portion is larger than a greatest diameter of the upper end and is smaller than an outer periphery of the bottom end.

2. The rechargeable battery of claim 1, wherein the upper end of the first terminal pillar comprises:

an upper protruding portion at a top portion of the slit groove and protruding toward the first terminal plate; and a lower protruding portion at a bottom portion of the slit groove and protruding toward the first terminal plate.

3. The rechargeable battery of claim 2, wherein a bottom surface of the upper protruding portion and a top surface of the lower protruding portion are parallel with a top surface of the cap plate.

4. The rechargeable battery of claim 2, wherein the slit groove has a ring shape and extends along the outer periphery of the first terminal pillar.

5. The rechargeable battery of claim 2, wherein the upper protruding portion is formed by riveting or spinning.

6. The rechargeable battery of claim 2, wherein the slit groove, the upper protruding portion, and the lower protruding portion of the first terminal pillar contact the protruding portion and an inner surface of the first terminal opening of the first terminal plate.

7. The rechargeable battery of claim 1, wherein the protruding portion of the first terminal plate protrudes toward a central axis of the first terminal pillar.

8. The rechargeable battery of claim 1, wherein a top surface of the connecting portion of the first terminal pillar contacts a bottom surface of the first terminal plate.

9. A rechargeable battery comprising:

a case;

an electrode assembly accommodated in the case;

a cap plate sealing a top opening of the case; and a first electrode terminal comprising:

a first terminal pillar electrically connected to the electrode assembly, the first terminal pillar comprising:

an upper end which upwardly protrudes from the cap plate and has a slit groove extending along an outer periphery thereof;

a bottom end connected to the electrode assembly; and a connecting portion extending between the upper end and the bottom end and passing through the cap plate, a diameter of the connecting portion being larger than a diameter of an uppermost end of the first terminal pillar and being smaller than a diameter of the bottom end; and a first terminal plate having a first terminal opening extending through the first terminal plate, a greatest diameter of the first terminal opening being smaller than a greatest diameter of the connecting portion, the upper end of the first terminal pillar being arranged in the first terminal opening and being exposed through the first terminal plate, the first terminal plate comprising a protruding portion which protrudes into the first terminal opening and is in the slit groove of the first terminal pillar to couple the first terminal plate to the first terminal pillar, the protruding portion of the first terminal plate having a top surface spaced apart from an upper surface of the first terminal plate and a bottom surface spaced apart from a bottom surface of the first terminal plate, wherein the upper end, the bottom end, and the connecting portion are made of a same material.

* * * * *